July 21, 1959  E. F. HUDDLE ET AL  2,895,278
MOWER CONTROL MECHANISM
Filed Aug. 22, 1957

Inventors
Edwin F. Huddle
John D. Clark
Paul O. Pippel
Attorney

United States Patent Office 2,895,278
Patented July 21, 1959

2,895,278
MOWER CONTROL MECHANISM

Edwin F. Huddle, Elmwood Park, and John D. Clark, Westmont, Ill., assignors to International Harvester Company, Chicago, Ill., a corporation of New Jersey Application August 22, 1957, Serial No. 679,655

6 Claims. (Cl. 56—25)

This invention relates to mowers and more specifically to a novel mechanism for lifting a mower to several operating positions and tilting the mower bar.

A general object of the invention is to provide a novel control mechanism for positioning the mower wherein the parts are maintained in tension to prevent rattling and vibrating and consequent accelerated wear.

A further object of the invention is to provide a novel hydraulic lift system for a mower wherein the ram is floatingly mounted and parallel with the counterbalancing arrangement whereby the spring is utilized to counterbalance the mower in its normal operating range and is additive to the action of the ram in order to lift and gag the mower bar.

Figure 1:
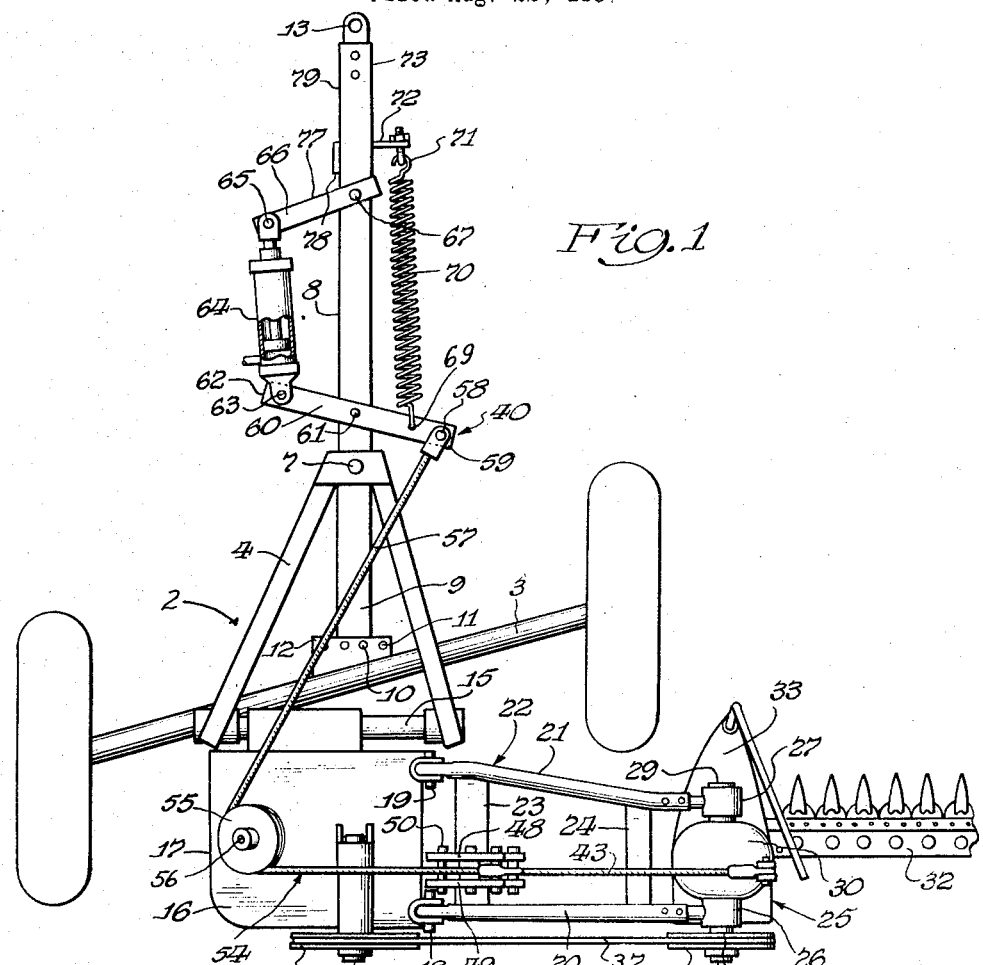
Figure 2:
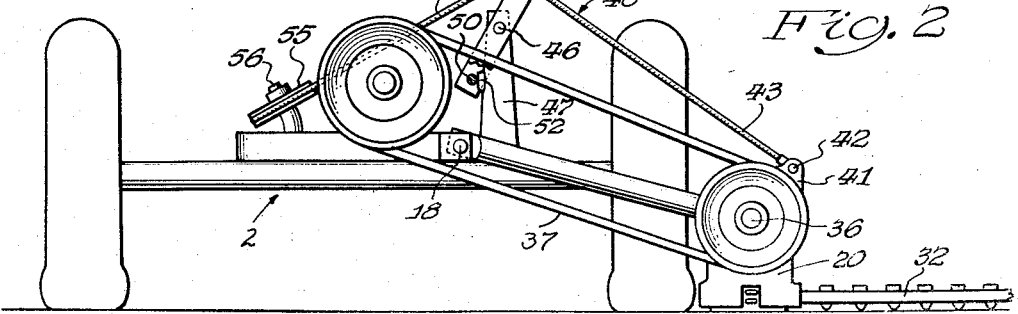

These and other objects of the invention will become more apparent from the specification and the drawings, wherein:

Figure 1 is a plan view with parts broken away and shown in section of a mower structure incorporating the invention, and Figure 2 is a rear elevational view.

Describing the invention in detail, the mower 2 is herein shown for purposes of illustration as a trailer-type which comprises a wheel and axle assembly 3 which supports a frame work 4 which is approximately an A frame, the apex of which has pivotally connected as at 7 an intermediate portion of a draft member or tongue 8 which is part of the mower frame. The rear end of the tongue 8 is adjustably connected as at 9 by means of a pin 10 which enters suitable holes 11 in the plate structure 12 connected to the axle assembly 3. The tongue or hitch member 8 is thus swingable horizontally in order to position the mower in different locations laterally with respect to the pulling vehicle which is connected to the forward hitch point 13 on the hitch member 8 as is conventional. The rear ends of the A frame 4 carry a cross member 15 on which is mounted the mower framework 16 which includes the plate-like body structure 17 to which are pivotally connected as at 18 and 19 on coaxial generally horizontal axes the rear and front coupling members 20 and 21 of the coupling frame or structure generally indicated 22, said members 20 and 21 being interconnected by the cross braces 23 and 24 and serving to support the mower or implement part generally designated 25 on the bearings 26 and 27 through the trunnions 28 and 29 which extend fore and aft coaxially from the power transmitting housing, casing or box 30 of the mower 25. It will be seen thus that the coupling frame 22 swings vertically about the axis of the pins 18 and 19 to raise and lower the mower 25 and that the mower or cutting mechanism 25 swings about the axis of the trunnions 28 and 29 to position the mower bar at different angles with reference to the ground, the mower bar structure 32 being connected to the inner shoe 33 which serves as a foundation and a mounting for the housing 30. It will be seen that the drive to the mower bar 32 is through the housing 30 by suitable mechanism which is shown and described in U.S. application Serial No. 593,156 for Balanced Head Mower filed by John R. Orelind, now U.S. Patent 2,824,416, and that the drive to the mower is had through the pulley 35 which is mounted on the input shaft 36, the pulley 35 being driven from a belt 37 which in turn is driven from a pulley 38 driven from the power output shaft 39 which proceeds in the usual manner over the top of the draft member 8 to the motivating vehicle such as a tractor power take-off.

The position of the mower is controlled by the tension or operating or lifting linkage generally designated 40 which includes an upstanding lever arm or ear 41 on the case 30 outwardly of the axis of pivot on the trunnions 28 and 29 and the shaft 36 coaxial therewith. The lug 41 is pivoted at its upper end as at 42 to the outer end of a lifting means in the form of pull rod or tension cable 43 which at its inner end is pivoted as at 44 to the upstanding lever 45 intermediate its ends. The lever 45 is pivoted immediate its ends as at 46, at a point lower than the point 44, to the upper end of an upright arm or anchor standard 47 which is upstanding and integral with the coupling frame 22. The lever assembly 45 is herein shown in the present instance as comprising a pair of side members 48 and 49 which embrace the post 47 therebetween and the lower ends of the links 48 and 49 of the lever assembly 45 are provided with a cross connecting abutment member 50 which is adapted to abut against a limiting stop 52 to limit rotation in a counterclockwise direction in Figure 2 of the lever assembly 45 for purposes hereinafter described.

The upper end of the lever assembly 45 is pivotally connected as at 53 to the upper end of a tension cable or member 54 which is angled downwardly stubblewardly of the mower and wraps about a sheave 55 which is rotatably mounted on the stub shaft 56 connected to the mower frame body portion 17. The control member 54 has a forwardly extending length 57 which at its forward end is pivotally connected on a substantially vertical axis as at 58 to one end 59 of a horizontally positioned operating lever 60, said lever 60 being of the first class and pivoted intermediate its ends substantially centrally thereof as at 61 to the draft tongue 8 intermediate its ends and the opposite end 62 of the primary operating lever 60 is pivotally connected as at 63 to one end of a hydraulic ram 64. The opposite end of the hydraulic ram 64 which lays or extends lengthwise generally horizontally is pivotally connected as at 65 to the outer end of a support or first or fore lever or link 66 which at its other end 57 is connected to the tongue 8 on a substantially vertical axis adjacent its forward end.

The second or off lever 60 is pivotally connected adjacent to its first end 59 as at 69 to one end of a tension spring 70 which extends forwardly therefrom toward the forward end of the draft member 8 and the forward end 71 of the spring is anchored by a lug 72 to a side 73 of the tongue member 8 adjacent to its forward end. Thus it will be seen that the spring 70 is continuously stretched in tension and exerts a tensile pull on the length 57 forwardly and thus pulls the length 74 of the cable 54 downwardly leftwardly as seen in Figure 2 thereby rotating or tending to rotate the lever assembly 45 in a counterclockwise direction with attendant upward and leftward pull of the linkage 43 leftwardly with attendant lifting of mower 32.

When it is intended to lift the mower the ram 64 is activated and extends swinging link 66 forwardly and engaging its edge 77 with the stop 78 on side 79 of the tongue 9. The lever 60 then swings counterclockwise (Fig. 1) and the cable length 57 is pulled forwardly the length 74 leftwardly (Fig. 2) swinging lever 45 counterclockwise pulling cable 43 leftwardly until stop 50 engages stop 47 whereupon the frame 22 swings bodily upwardly with the mower 32 about pivots 18 and 19. The action is reversed when the ram is deactuated to lower the mower.

What is claimed is:

1. In a mower having a frame, a cutting mechanism carried thereby for vertical movement from a lowered operating position in which it tends to remain because of its own weight and a raised transport position to which it must be forcibly moved, the improvement comprising: a pair of laterally spaced levers pivotally supported on the frame, a ram extending between and pivotally connected thereto, a linkage operatively interconnecting one of said levers with said cutting mechanism in tension, spring means connected between said one lever and the frame and acting through said one lever in a direction applying a tension load to said linkage, and stop means on the frame abuttable with said other lever to limit spreading movement thereof with respect to said one lever upon expansion of the ram to provide a fixed anchor therefor.

2. In an implement having a frame and an implement part carried thereby for vertical movement from a lowered operating position in which it tends to remain because of its own weight and a raised transport position to which it must be forcibly moved, the improvement comprising: a tension linkage connected between said implement part and the frame and including lever means pivotally supported on the frame, a ram interconnecting said lever means, a stop on the frame for limiting swinging movement of one portion of said lever means during extension of said ram, said tension linkage connected to said lever means, and spring means connected to said lever means in parallel with said ram and operatively connected to said frame for applying a tension load on said tension linkage.

3. The invention according to claim 2 and further characterized in that said lever means comprises first and second levers and said first lever pivoted at one end to the related end of the ram and at its other end to the frame and said second lever pivoted intermediate its ends to the frame and pivoted at one end to the ram and at its other end to said tension linkage and pivotally connected adjacent to said other end to said spring means.

4. In a mower having an ambulatory frame, a coupling frame pivoted at one end to said support frame on a fore and aft axis for vertical swinging movement, a mower assembly pivoted to the other end of the coupling frame for vertical pivotal movement, a linkage for swinging said mower assembly upwardly about its pivot to the coupling frame and then bodily swinging said assembly with said coupling frame about the pivot of the latter and comprising a lever of the first class pivoted intermediate its ends on the support frame and having an output end connected to the linkage and having an input end, ram means having a lost-motion connection with the support frame, counterbalancing spring means mounted on the support frame, said spring means connected to said output end of the lever and loading the linkage in tension and said ram means connected to the input end of the lever and in extension cooperating with said spring means to load said linkage in tension.

5. In a trailer type mower having an ambulatory frame including a fore and aft extending tongue, a cutting mechanism carried by the frame for vertical movement between operating and transport positions, fore and aft levers pivoted to said tongue, operating linkage connected between said aft lever and said mechanism in operating relation to the latter, a tension spring connected to the aft lever and extending therefrom and anchored to a portion of the tongue forwardly of the aft lever, ram means extending generally parallel to the tongue between and connected at opposite ends to respective levers, and a stop on the frame forwardly of said forward lever for limiting forward swinging movement thereof as said ram means is expanded.

6. In a mower having a frame, a coupling structure extending laterally of the frame and connected thereto for vertical swinging movement, a mower assembly disposed in end to end relationship with said structure, said assembly and structure pivotally interconnected at adjacent ends on a fore and aft axis accommodating vertical swinging movement of the assembly, an upstanding lever arm connected to the mower assembly, lifting means connected to said lever arm, a standard connected to said coupling structure, a lever pivoted intermediate its ends on a generally horizontal axis to said standard and having abutment means at its lower end abuttable with said standard and having an upper end pivotally connected to said lifting means, and means connected to the upper end of said lever for operating the same.

References Cited in the file of this patent

UNITED STATES PATENTS

| | | |
|---|---|---|
| 2,463,726 | Synck et al. | Mar. 8, 1949 |
| 2,580,266 | Abgarian | Dec. 25, 1951 |
| 2,617,242 | Iverson | Nov. 11, 1952 |
| 2,779,145 | Smith | Jan. 29, 1957 |